(12) United States Patent
Gudjonsson

(10) Patent No.: US 6,334,748 B1
(45) Date of Patent: Jan. 1, 2002

(54) SCREW WITH CUTTING HEAD AND SELF TAPPING CUTTER

(76) Inventor: Sigurdur Gudjonsson, R.F.D. #3, Middlebury, VT (US) 05753

( * ) Notice: Subject to any disclaimer, the term of this patent is extended or adjusted under 35 U.S.C. 154(b) by 0 days.

(21) Appl. No.: 09/733,713

(22) Filed: Dec. 11, 2000

(51) Int. Cl.⁷ .......................... F16B 23/00; F16B 25/04
(52) U.S. Cl. ..................................... 411/399; 411/387.1
(58) Field of Search .................................. 411/399, 386, 411/387.1, 387.8, 403, 187, 188

(56) References Cited

U.S. PATENT DOCUMENTS

| | | | |
|---|---|---|---|
| 1,238,636 A | * | 8/1917 | Christofferson |
| 2,764,053 A | * | 9/1956 | Lovisek |
| 3,136,205 A | * | 6/1964 | Ansingh |
| 5,518,352 A | * | 5/1996 | Lieggi ..................................... |

\* cited by examiner

Primary Examiner—Flemming Saether
(74) Attorney, Agent, or Firm—John J. Welch, Jr., Esq.

(57) ABSTRACT

A screw device with an elongated shank, a self-tapping cutter located thereon on and with a cutting head within which there are two equivalent and opposing grooves the angularity of which with reference to horizontal is the same and equivalent to the angular pitch of the threading about the shank and with serrated edging about the bottom side of the cutting head and in the top side of the cutting head there being found a closed hole.

4 Claims, 4 Drawing Sheets

SCREW WITH CUTTING HEAD AND SELF TAPPING CUTTER

B. CROSS REFERENCES TO PRIOR OR PARENT APPLICATIONS

Figure 1:
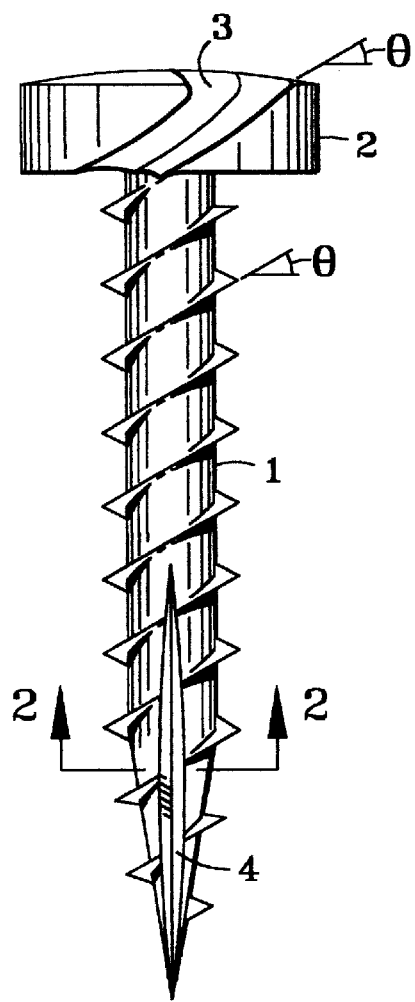

There are no prior or parent applications to which the instant invention relates.

C. FEDERALLY SPONSORED RESEARCH AND DEVELOPMENT

There is no federally sponsored research or development to which the instant application relates.

D. BACKGROUND OF THE INVENTION

1. Field of the Invention

The instant invention is one such as would be noted to be within that particular field of devices consisting of screws, bolts and the like.

2. Related Art

Your inventor is unaware of any art such as would serve to anticipate the instant invention.

E. A SUMMARY OF THE INVENTION

1. A BRIEF DESCRIPTION OF THE INVENTION

The instant invention is a screw. The head of the screw is cylindrically shaped with a pair of equivalent and opposing curved grooves cut therein. It is the presence of these grooves that operates to transform the head into a novel and unique cutting head. The angular pitch with reference to the horizontal is the same for both grooves and equals as well the pitch of the threading found on the shank portion of the screw. Within the top side of the cutting head of the invention there is to be found a closed hole for receipt of the tip of a screwdriver or alternatively, drill bit. Typically though not necessarily, the closed hole is triangular in shape for receipt of a similarly shaped screwdriver or alternatively, drill bit. Moreover, serrated edging circumscribes a portion of the perimeter of the bottom side of the cutting head of the preferred embodiment of the instant invention. The lower portion of the shank of the screw is characterized by the presence of an elongated concave shaped self-tapping cutter that conjoins with the shank of the screw in respect of terminating in a sharp point.

2. OBJECTS OF THE INVENTION

Finished carpenters virtually always find it desirable to be able to insert a screw clearly into wood and, in particular, hardwood, in such a manner that once in it will remain in place tightly positioned and not likely to loosen over time.

The instant invention serves to maximize the probability that such will indeed prove to be the case. The self-tapping cutter of the instant invention coupled with the curved grooves within the head of the screw allow for expulsion of wood debris from a hole therein being created simultaneously with the screwing therein of the instant invention. This phenomenon intrinsically characteristic of the process of so utilizing the instant invention results in the formation of a tight, clean screw hole free of wood debris within which the instant invention fits very tightly, neatly and with virtually no propensity for eventual loosening. An especially unique feature of the invention such as serves to greatly facilitate such an outcome is one wherein the angularity of each of the curved grooves and that of the pitch of all of the threading on the shank portion of the screw is one and the same. Moreover, given the unique characteristics of the instant invention, it can be placed on a drilling chuck and drilled directly into a wood surface without any need whatsoever to initially drill a hole for it to be inserted into. Thus, an object of saving work time while likewise maximizing screw hole tightness is uniquely addressed. Also, the instant invention is readily amenable to being countersunk into wood and then filled over so as to completely obscure its presence at all within the wood into which it would have been applied. This feature addresses the object of enhancing aesthetics as respects finish carpentry work. Finally, the triangularly shaped closed hole within the top of the cutting head portion of the instant invention serves to facilitate minimization of any propensity for slippage or so-called stripping of a screw like device while at the same time providing a means for applying maximum torque in respect of turning the instant invention into wood, for example, on the end of a rapidly turning drill. The instant invention is moreover where desired also amenable to being inserted and countersunk into metal as well.

In view of the foregoing, it is respectfully submitted that the instant invention is indeed not only new and unique but unquestionably useful.

F. A DESCRIPTION OF THE DRAWINGS

Figure 2:
Figure 3:
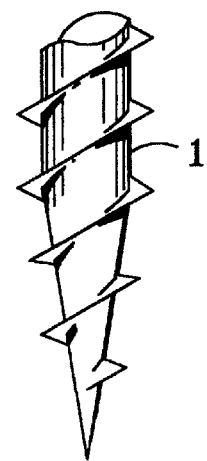
Figure 4:
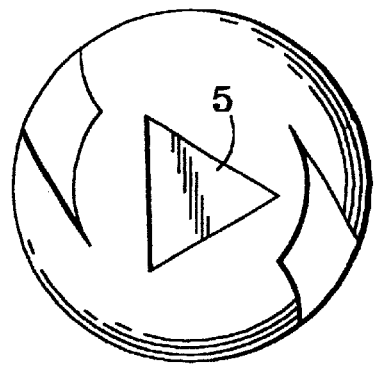
Figure 5:
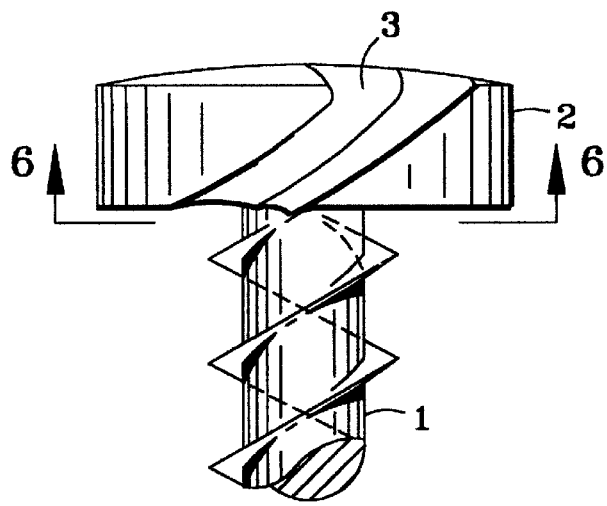
Figure 6:
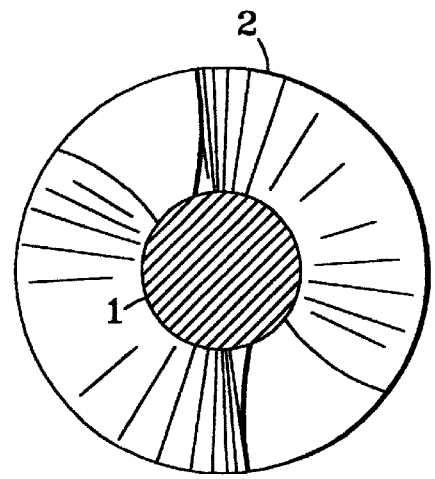
Figure 7:
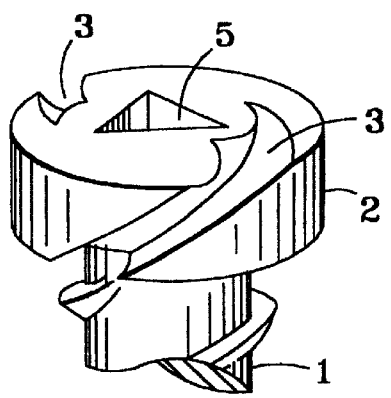
Figure 8:
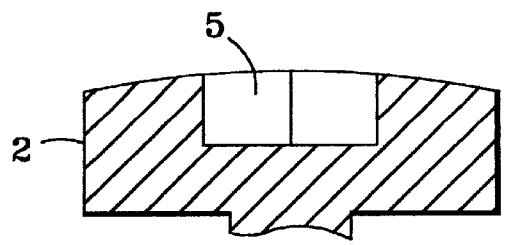
Figure 9:
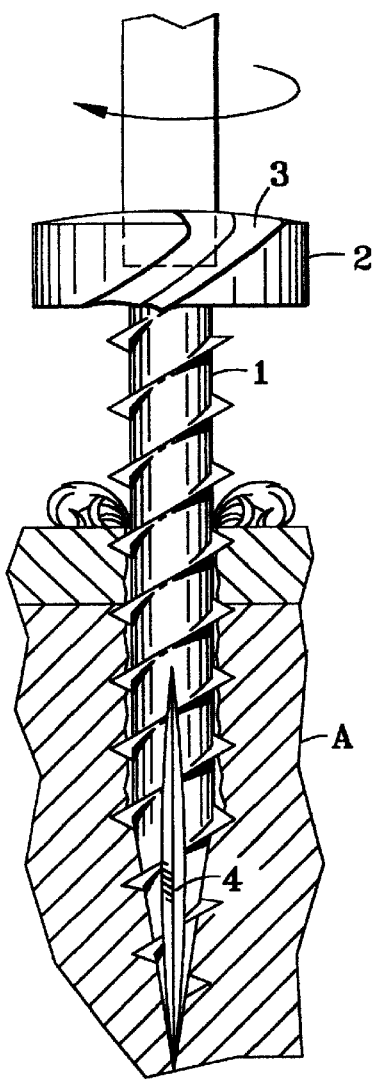
Figure 10:
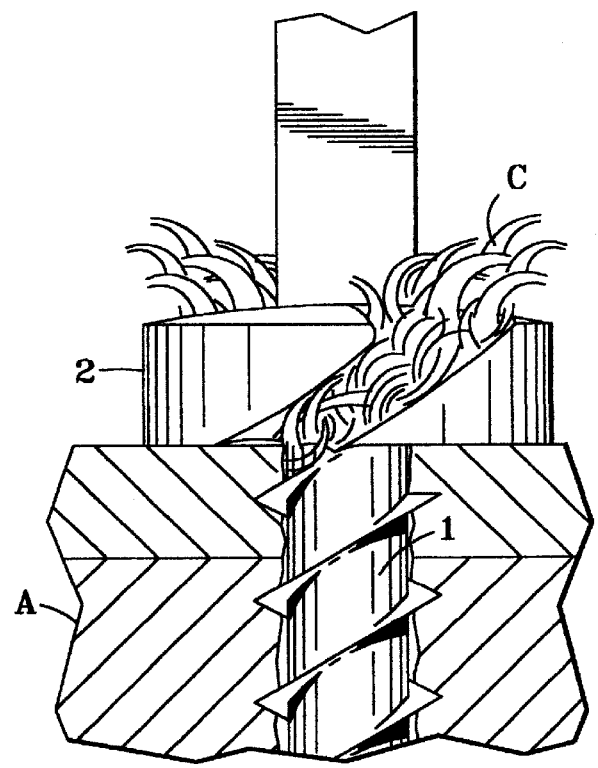
Figure 11:
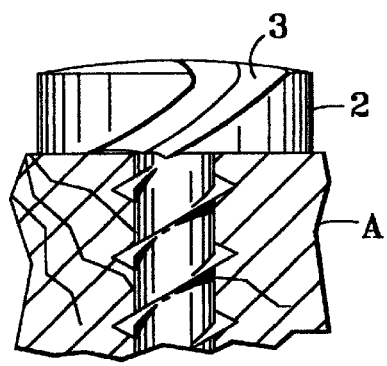
Figure 12:
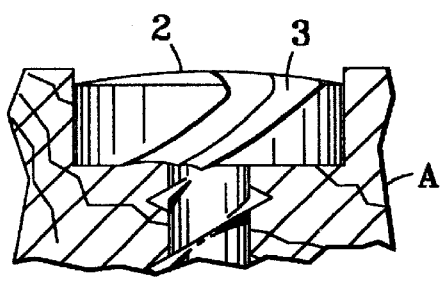
Figure 13:
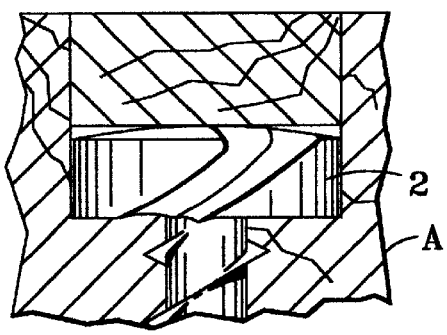
Figure 14:
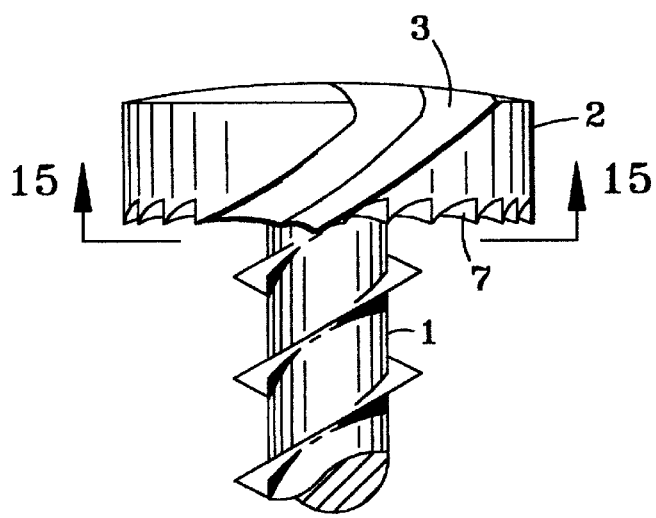
Figure 15:
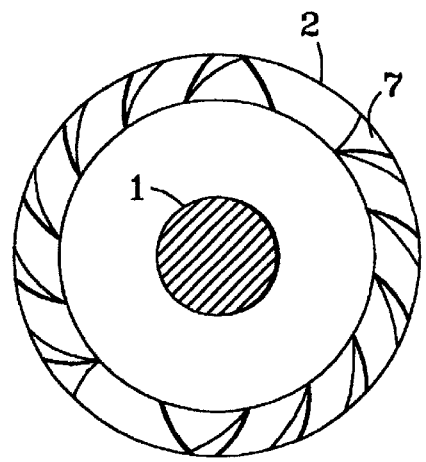
Figure 16:
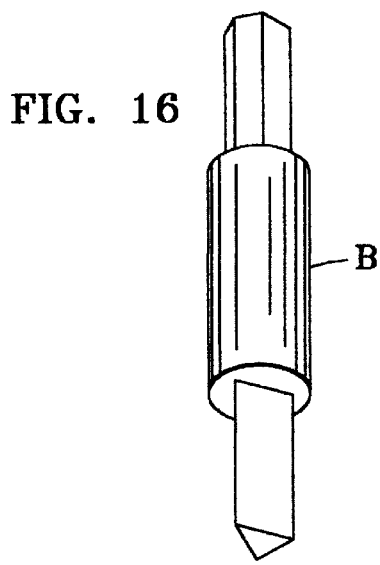

1. FIG. 1 is a lateral plan view of the instant invention.
2. FIG. 2 is a horizontal cross-sectional view of the shank portion of the instant invention cut in the vicinity of the self-tapping cutter of the instant invention.
3. FIG. 3 is a second, differing lateral plan view of a lower part of the shank portion of the instant invention.
4. FIG. 4 is a top plan view of the preferred embodiment of the instant invention.
5. FIG. 5 is an isolated lateral plan view of the uppermost portion of one embodiment of the instant invention.
6. FIG. 6 is a bottom plan view of the cutting head portion of the instant invention.
7. FIG. 7 is an isolated perspective view of the uppermost portion of the embodiment of the instant invention shown in FIG. 5.
8. FIG. 8 is a cross-sectional view of the cutting head of the instant invention.
9. FIG. 9 illustrates an early phase of insertion of the instant invention into wood or metal.
10. FIG. 10 illustrates an a later phase of insertion of the instant invention into wood or metal.
11. FIG. 11 illustrates completed insertion of the instant invention into wood or metal.
12. FIG. 12 illustrates completed countersunk insertion of the instant invention into wood or metal.
13. FIG. 13 illustrates completed countersunk insertion of the instant invention into wood or metal thereafter filled in from above with wood or metal.
14. FIG. 14 is an isolated lateral view of the uppermost portion of another embodiment of the instant invention.
15. FIG. 15 is a bottom plan view of the cutting head of the embodiment of the instant invention show in FIG. 14.
16. FIG. 16 depicts a device for turning the instant invention through an angle.

G. A DESCRIPTION OF THE PREFERRED EMBODIMENTS

FIG. 1 evidences the instant invention in plan view. One notes therefrom a shank 1 of a screw affixed to a bottom side of a head 2 thereof. Head 2 is a cutting head by virtue of the presence of a pair of oppositely positioned curved grooves 3 within the body of head 2. At the lower portion of shank 1 there is to be found a concavely shaped self-tapping cutter 4 formed by virtue of a removal of material from the body of shank 1. It will be noted from FIG. 1 that the threading of the screw extends from a locus upon shank 1 adjacent the bottom of head 2 and from that point down the shank. Self-tapping cutter 4 is tapered to a point at an uppermost portion thereof and tapers to a sharp point coincident with the lowest point of shank 1. FIG. 2 illustrates in cross-sectional view, the formation of self-tapping cutter 4 within the body of shank 1. FIG. 3 evidences a lower portion of shank 1 opposite where within shank 1, self-tapping cutter 4 is found. FIG. 4 in top plan view shows a closed hole 5 in the shape of an equilateral triangle found within the top side of cutting head 2. FIGS. 5 and 6 are views of cutting head 2 within which there are found grooves 3 with cutting head 2 affixed at bottom side thereof to a top side of shank 1. It can be noted with reference to FIGS. 1 and 5 that all bits of the threading upon shank 1 have an equivalent angular pitch that exceeds horizontal and that likewise the angularity of each curved groove 3 is the same and likewise the same as the angular pitch of each bit of such threading. The essential features of the instant invention are likewise further appreciated with resort to FIGS. 7 and 8. In a preferred embodiment, the foregoing features are found and additionally serrated edging 7 will be found about a portion of the outer perimeter of the bottom bide of cutting head 2 as can be noted with resort to FIGS. 14 and 15.

A closed hole 5 in the shape of an equilateral triangle serves to most readily ensure an absence of hole damage or shank stripping upon insertion of the instant invention into wood, for example, hardwood by way of resort to a rapidly turning drill bit creating a lot more torque on a screwhead then would be created by the mere manual turning of a screwdriver. Also, an equivalent angular pitch of all bits of threading on shank 1 which is, in turn equivalent to the angularity of the above-mentioned curved grooves serves to facilitate quick and easy turning of the screw within, for example, hardwood while at the same time ensuring that a maximal amount of debris will be expelled from the hole created by a turning of the instant invention in the interest of fostering dependable and unquestionably long lasting fastening capacity. Serrated edging 7 serves to facilitate fastening especially to the level below the plane of an outer surface of hardwood.

It is very important for finish carpenters to be able to complete their work with but an absolute minimum of fraying or dysymmetry, gouging and the like. Moreover, it is important for their work once finished to remain intact and continuously aesthetically pleasing over time hopefully measured in terms of a multitude of years. One very important means by which any such results within the realm of finish carpentry can be reached, is to ensure that screw holes into which screws are inserted are neat, tight and relatively free of debris so that any loosening of such screws over time is minimized to the fullest possible extent. The utility of the instant invention is measureable in terms of how so very well it uniquely helps to enable a craftsman to achieve such goals. FIG. 9 illustrates insertion of the preferred embodiment into wood A by way of use of a turning device being either a special bit for insertion into a drill chuck or perhaps just a particularly compatible screwdriver. An exemplar turning device B is depicted in FIG. 16. And, it is also well worth noting that by virtue of the above described features of the instant invention, there is no need on the part of a finish carpenter to have to pre-drill a screw hole into wood A before inserting a screw into the hole.

The instant invention can be drilled directly into wood A forming a tight, debris free screw hole during direct insertion. Such obviation of a need for pre-drilling saves time and further promotes achievement of desirable long term durable aesthetics. As the instant invention is drilled into wood A, self-tapping cutter 4 causes more ready dispensing of wood debris C to emanate from the hole being created in wood A upon such insertion. Moreover, as cutting head 2 also begins to penetrate wood A, as seen in FIG. 10, such debris C is further expelled from wood A via curved grooves 3 in cutting head 2. Efficiency in respect of expulsion is expedited by virtue of the angle equivalence of the angularity pitch of curved grooves and the angular pitch of all bits of threading along shank 1. It has moreover been determined that maximal efficiency in such respects occurs when such angular pitch is of the order of 30° plus or minus a few degrees. An appropriately inserted embodiment of the instant invention screwed fast into wood A is depicted in FIG. 11. But, oftentimes it might be desirable to have the instant invention screwed down to the level of wood A so that no portion of cutting head 2 would be found protruding therefrom subsequent to insertion such as for example as can be noted with resort to FIG. 12. Moreover, it might also be desirable to screw to a level actually below the outer surface of wood A and to thereafter fill in the remnant hole above a cutting head 2 so as to obscure the instant invention entirely as is depicted in FIG. 12. In short, all of these desirable goals couched in terms of durable aesthetics can quickly and ergonomically be accomplished with direct drilling rather than by way of pre-drilling followed by then slowly screwing a conventional screw into wood with a screwdriver by virtue of the above described new and unique features of the instant invention.

For the foregoing reasons, it is respectfully submitted that the instant invention is not merely new, useful and unique but is indeed virtually revolutionary within the aegis of the woodworking and carpentry arts.

What is claimed is:

1. A screw with cutting head and self-tapping cutter, comprising:

a. a cylindrically shaped cutting head;

b. a closed hole in a top side of said cutting head;

c. a pair of equivalent and oppositely positioned curved grooves cut into said cutting head;

d. an elongated shank affixed to a top side thereof to a bottom side of said cutting head;

e. a self-tapping cutter located within a lower portion of said shank;

f. said self-tapping cutter being concave in shape and tapered to a point at an uppermost portion thereof and tapering to a sharp point at a lowermost portion thereof;

g. sad elongated shank tapering to a point at a lowermost portion thereof coincident with said sharp point at said lowermost portion of said self-tapping cutter;

h. threading of said screw extending down said elongated shank beginning from a locus thereupon at a point adjacent a bottom side of said cutting head;

i. an angular pitch of all bits of said threading being equivalent and in excess of horizontal, and;

j. an angularity of each of said pair of equivalent and oppositely positioned curved grooves being equivalent and equivalent to said angular pitch of all said bits of said threading.

2. The screw with cutting head and self-tapping cutter of claim 1, whereby said closed hole is in a shape of an equilateral triangle.

3. A screw with cutting head and self-tapping cutter, comprising:
- a. a cylindrically shaped cutting bead with serrated edging about a portion of a perimeter of a bottom side thereof;
- b. a closed hole in a top side of said cutting head;
- c. a pair of equivalent and oppositely positioned curved grooves cut into said cutting head;
- d. an elongated shank affixed at a top side thereof to said bottom side of said cutting head;
- e. a self-tapping cutter located within a lower portion of said shank;
- f. said self-tapping cutter being concave in shape and tapered to a point at an uppermost portion thereof and tapering to a sharp point at a lowermost portion thereof;
- g. said elongated shank tapering to a point at a lowermost portion thereof coincident with said sharp point at said lowermost portion of said self-tapping cutter;
- h. threading of said screw extending down said elongated shank beginning from a locus thereupon at a point adjacent a bottom side of said cutting head;
- i. an angular pitch of all bits of said threading being equivalent and in excess of horizontal, and;
- j. an angularity of each of said pair of equivalent and oppositely positioned curved grooves being equivalent and equivalent to said angular pitch of all of said bits of said threading.

4. The screw with cutting head and self-tapping cutter of claim 3, whereby said closed hole is a shape of equilateral triangle throughout.

* * * * *